US007853719B1

(12) United States Patent
Cao et al.

(10) Patent No.: US 7,853,719 B1
(45) Date of Patent: Dec. 14, 2010

(54) SYSTEMS AND METHODS FOR PROVIDING RUNTIME UNIVERSAL RESOURCE LOCATOR (URL) ANALYSIS AND CORRECTION

(75) Inventors: Jian Cao, Redmond, WA (US); Zhanliang Chen, Sammamish, WA (US); Saurab Nog, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 10/073,618

(22) Filed: Feb. 11, 2002

(51) Int. Cl.
*G06F 15/16* (2006.01)
(52) U.S. Cl. .................................... 709/245; 709/203
(58) Field of Classification Search ................ 709/245, 709/203
See application file for complete search history.

(56) References Cited

U.S. PATENT DOCUMENTS

| | | | | |
|---|---|---|---|---|
| 5,907,680 | A * | 5/1999 | Nielsen | 709/228 |
| 6,526,440 | B1 | 2/2003 | Bharat | 709/219 |
| 6,529,903 | B2 | 3/2003 | Smith et al. | 707/7 |
| 6,604,143 | B1 * | 8/2003 | Nagar et al. | 709/229 |
| 6,615,209 | B1 | 9/2003 | Gomes et al. | 707/5 |
| 6,658,423 | B1 | 12/2003 | Pugh et al. | 707/102 |
| 6,678,681 | B1 | 1/2004 | Brin | 707/6 |
| 6,687,734 | B1 * | 2/2004 | Sellink et al. | 709/203 |
| 6,760,746 | B1 * | 7/2004 | Schneider | 709/203 |
| 6,976,019 | B2 * | 12/2005 | Davallou | 707/6 |
| 7,058,626 | B1 * | 6/2006 | Pan et al. | 707/4 |
| 2002/0052934 | A1 * | 5/2002 | Doherty | 709/219 |
| 2002/0123988 | A1 | 9/2002 | Dean et al. | 707/3 |
| 2002/0133481 | A1 | 9/2002 | Smith et al. | 707/3 |
| 2003/0110021 | A1 * | 6/2003 | Atkin | 704/1 |
| 2003/0115279 | A1 * | 6/2003 | Quine et al. | 709/207 |
| 2003/0182447 | A1 * | 9/2003 | Schilling | 709/245 |
| 2005/0235031 | A1 * | 10/2005 | Schneider et al. | 709/203 |

OTHER PUBLICATIONS

Brin, S. et al., "The Anatomy of a Large-Scale Hypertextual Web Search Engine," Aug. 7, 2000, 1-20.
Davis, P.M., "The Effect of the Web on Undergraduate Citation Behavior 1996-1999," *J. Am. Soc. Inf. Sci. Technol*, 2001, 52(4), 309-314.

(Continued)

*Primary Examiner*—George C Neurauter, Jr.
*Assistant Examiner*—Asghar Bilgrami
(74) *Attorney, Agent, or Firm*—Woodcock Washburn LLP

(57) ABSTRACT

Systems and methods are provided that perform automatic URL analysis and correction in a computing system. The systems and methods automatically detect misentered or incorrect URLs, analyzing the invalid URLs with respect intelligent rules and valid URLs, and where a high likelihood exists for alternative URLs being intended, the alternative URLs are presented to the user as suggestions. The URLs used for comparison to the URL input may be collected through multiple channels or from multiple sources, which may be dynamically updated sources, including URLs commonly or newly found on the Web, users' favorite URLs and the like, as well as URLs from a standard URL list or database, all of which may be from one or more multi-lingual domain. In various embodiments, the alternative URL(s) are automatically presented when there is a very high confidence that the alternatives are desirable. Optionally, a mini search or a full blown search on the URL input may be performed and presented to the user to supplement the alternative URL suggestions. The systems allow a user to seek help or technical information about the URL navigation or search attempt and also allow a user to easily retry the query, ignoring the suggestions.

41 Claims, 12 Drawing Sheets

OTHER PUBLICATIONS

Gershon, N., "Moving Happily Through the World Wide Web," *IEE Comp. Graphics Applications*, 1996, 16(2), 72-75.

Olsen, S., "Microsoft Gives Error Pages New Direction," (Tech News—CNET.com), *Fortune*, Sep. 5, 2001, 4 pages.

Seiford, L.M., "A bibliography for Data Envelopment Anaysis (1978-1996)," *Annals Operation Res.*, 1997, 73, 393-438.

Stanyer, D. et al., "Human Factors and the WWW: Making Sense of URLs," *Proceedings of INTERACT'99—Human-Computer Interaction*, Aug. 30-Sep. 3, 1999, Edinburgh, UK.

* cited by examiner

Prior Art

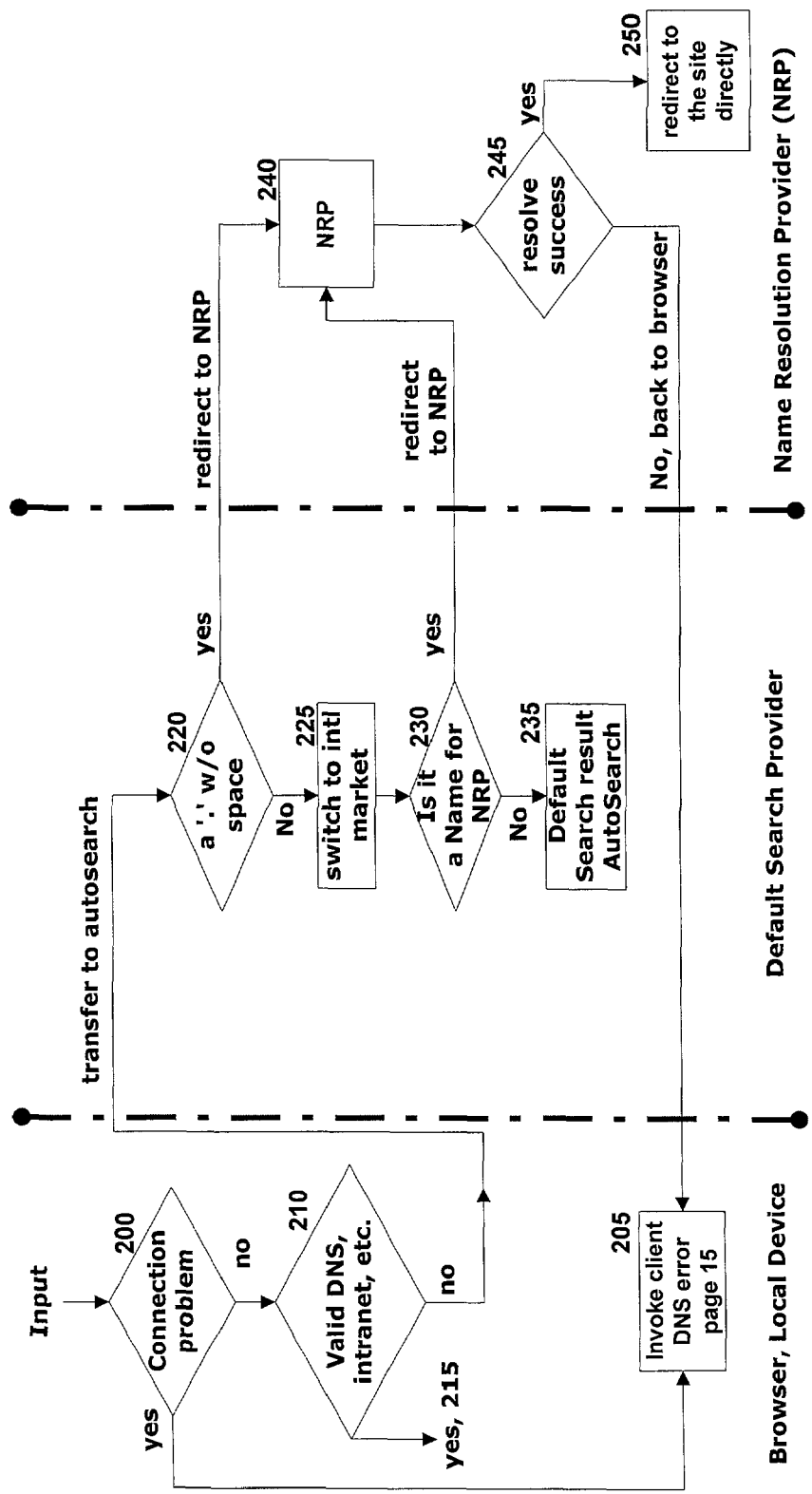
Fig. 2 - Prior Art URL Input Processing

SYSTEMS AND METHODS FOR PROVIDING RUNTIME UNIVERSAL RESOURCE LOCATOR (URL) ANALYSIS AND CORRECTION

NOTICE OF TRADEMARK USE

The names of any actual Web sites referred to herein are trademarks of their respective owners and are used descriptively. No association with any source of goods or services is intended or should be inferred.

FIELD OF THE INVENTION

The present invention relates to the provision of automatic analysis and correction of Universal Resource Locators (URLs) in a computing system. More particularly, the present invention relates to the provision of analysis and correction of domain names of URLs in connection with a service, such as a navigation service or search service, in a computing system.

BACKGROUND OF THE INVENTION

As the use of portal Web sites, searchable engines providing links to Universal Resource Locators (URLs), URL address windows, applications with links to URLs and the like becomes more widespread, so have the chances for the occurrence of a number and variety of errors in URL input. For example, present browsers have the capabilities of displaying and/or navigating to a URL when any one or more of the following occurs: (1) when a protocol or resource identification is prefixed to navigate to a URL, (2) when a user enters a URL and begins by inputting "go", "find", "?" or the like, (3) when the URL is requested incident to a standard file system, i.e., when a local computer resource, such as a file or desktop link, requests a lookup, (4) when a user requests one or more of his/her favorite URLs or favorite titles, (5) when a user requests one or more of his/her historical URLs, (6) as part of an intranet lookup and (7) any other runtime service that implicates URL navigation or searching. If any of these succeeds, a browser navigates to the URL correspondingly. In brief, anytime a user's or application's services implicates the navigation to or searching on a URL, a URL is being specified which may result in mistaken URL input.

As for variety of errors: (1) an error may occur when inputting an intended URL and (2) a user may mistakenly input a first URL while a second URL is intended. Of the first kind, there are strictly protocol type errors, wherein a user, for instance, incorrectly adheres to the "http://" prefix protocol common to all Web site URL inputs or the like by omitting periods, substituting semicolons, incorrectly positioning or spelling the prefix and/or the like. These types of errors occur in part because the common parts of URLs are difficult to type and/or remember for some. It is easy to confuse a semicolon for a colon, for example, or to use a back slash instead of a forward slash.

In certain cases, present browsers already autocorrect certain types of mistakes. For example, with certain browsers, a rudimentary URL protocol check is performed after a user types a URL in the address base. This "autocorrect" function, however, only fixes a protocol's name and punctuation. For example, with respect to mistakes in the prefix of a URL entry, there is a known syntax that can be autocorrected easily. For instance, "http;" can be autocorrected to "http:", "htttp" can be autocorrected to "http" and "http:\\" can be autocorrected to "http://". By providing a simple static database of known frequent URL typographical errors (typos), present browsers can correct some of the simple mistakes that a lot of users make. Some of these error corrections can be applied before the URL is sent, others may apply only if the first attempt returns with a DNS failure.

These autocorrections happen automatically without user intervention. Such presently existing autocorrect features may also check if there is a pluggable protocol, such as "outlook" which is not in the standard protocol yet, before correcting the URL protocol. This mechanism works reasonably simply. If there is no protocol tag, the browser tries the standard HyperText Transfer Protocol (HTTP). If there is a protocol resource tag, the browser does not send the URL to autosearch even if there are spaces in the URL input.

It is noted, however, that the autocorrect feature currently only fixes protocols. For example, if a colon or semicolon is detected, it may be assumed that the colon or semicolon is part of a potentially mistyped URL scheme. The portions adjacent to the colon or semicolon are compared with the known protocols to see if it is a pluggable protocol before trying to correct it. Currently known protocols that are corrected in this manner include protocols relating to "http", "ftp", "file", "gopher", "mailto", "news", "nntp", "telnet", "wais", "mk", "https", "local", "shell", "javascript", "vbscript", "about", "snews" and "res".

Present browsers can also use an autoscan function to try resolving the domain name service (DNS) name with a non-standard function. For instance, suffixes may be appended in the following order until an existing server is found: ".com", ".org", ".net" and ".edu". It is noted that further top level domains might be added to such a scheme as well.

Currently, if a user types a correct DNS name, but a wrong subdirectory or page path, e.g. www.microsoft.com/wrongpage, the user will receive one of multiple HTTP error codes. If a server, such as the microsoft.com server is present to field the input, the server handles the wrong subdirectory error. If the server does not have an error handling page, however, which may be judged by the attached HyperText Markup Language (HTML) page size, current browsers generally bring up a static error page, such as HTML error resource page 15 of FIG. 1.

If the autocorrect and autoscan functions are traversed and the browser still does not have a resolution, the browser passes control and the URL to autosearch. The autosearch function first checks for the provider of autosearch, which can be customized by the end user in a customization page. If the default search provider is changed to a non-default provider, control is passed to the non-default provider. If the default autosearch provider has control, the provider checks which language is being utilized.

Assuming English, for instance, the provider then checks if the URL input has a period in the raw string without a space ' ' in the raw string; if true, the default autosearch provider redirects to a name resolution provider (herein referred to as "NRP"), such as REALNAMES®, for resolution. If the name resolution provider can resolve the URL, navigation takes place directly to the site. If the name resolution provider cannot resolve the URL, this is the end of the process, i.e., the browser decides to call its built-in DNS error resource page, such as page 15 of FIG. 1. The NRP step is introduced to attempt multilingual domain name resolution. If the URL input does not meet the conditions of having a period without a space, the URL input is redirected to the default search engine, and a usual search on the URL input is conducted.

FIG. 2 illustrates these presently implemented techniques for URL input handling in more detail. At 200, if it is determined there is a connection problem, then an error page, such as error page 15, is invoked and displayed at 205. If the connection is valid, then at 210, it is determined whether there is a valid DNS name for the URL input, a valid intranet location for the URL input, etc. If so, then at 215, navigation to, or searching on, the URL input is performed. If not, however, control is transferred to the default search provider, if the default search provider is specified as explained above. At 220, it is determined whether the URL input has a period without a space. If so, then the URL input is redirected to NRP 240 in order to check against known names. If not, then at 225, a switch is made to the international (cultural, geographical, language, etc.) market and at 230, it is determined whether the URL input is a name for the NRP vis-à-vis the international market. If so, then the URL input is redirected to NRP 240. If not, then at 235, a default search is performed by the default search provider.

On the NRP side, once the URL input is redirected to the NRP 240, a determination is made whether the name can be resolved at 245. If not, then the browser displays the DNS error page 15 at 205. If so, then there is valid URL input and at 250, the flow is redirected to the site directly.

The current design, as described above, sends any URL with a period and without spaces to NRP 240 because NRP 240 can handle multilingual domain names, such as Chinese characters, in the domain name. However, it would be desirable to minimize the sending of names to NRP 240 that NRP 240 is unlikely to resolve because there is a roundtrip performance degradation associated therewith and NRP 240 is not always operationally reliable. Since the main value that NRP 240 adds is multilingual domain name resolution, it would be desirable to add a step of determining whether or not multilingual domain name resolution issues are present.

It would be further desirable to add additional intelligence on the client side for URL correction beyond mere protocol correction, and to leverage one or more databases including dynamic database(s) of current information about existing URLs.

There is thus a need for a mechanism that may be used in connection with a URL input operation to decipher when an input error has occurred, beyond a mere protocol error. There is a further need for a mechanism that may be used in connection with a URL input operation to decipher when a URL has an error with a high degree of confidence. There is still further a need for a mechanism that navigates to the correct URL as if the URL input error had not occurred. There is still further a need for a mechanism that determines whether a URL input error has occurred in a URL input operation vis-à-vis a plurality of dynamic data stores or sources, such as a dynamically updated Web-oriented dictionary combined with a static URL dictionary store.

SUMMARY OF THE INVENTION

In view of the foregoing, for an overall better user experience, the present invention provides systems and methods that provide automatic URL analysis and correction in a computing system. The invention automatically detects misentered or incorrect URLs, analyzing the invalid URLs with respect to intelligent rules and valid URLs, and where a high likelihood exists for alternative URLs being intended, the alternative URLs are presented to the user as suggestions. The URLs used for comparison to the URL input may be collected through multiple channels or from multiple sources, which may be dynamically updated, including URLs commonly or newly found on the Web, users' favorite URLs and the like, as well as URLs from a standard URL list or database, all of which may be from one or more multi-lingual domain. In various embodiments, the alternative URL(s) are automatically presented when there is a very high confidence that the alternatives are desirable. Optionally, a mini search or a full blown search on the URL input may be performed and presented to the user to supplement the alternative URL suggestions. The systems allow a user to seek help or technical information about the URL navigation or search attempt and also allow a user to easily retry the query, ignoring the suggestions.

Other features and embodiments of the present invention are described below.

BRIEF DESCRIPTION OF THE DRAWINGS

The systems and methods for providing automatic URL analysis and correction in a computing system are further described with reference to the accompanying drawings in which:

FIG. 2 is an exemplary flow diagram illustrating a current method for processing URL input;

DETAILED DESCRIPTION OF PREFERRED EMBODIMENTS

Overview

Figure 1:
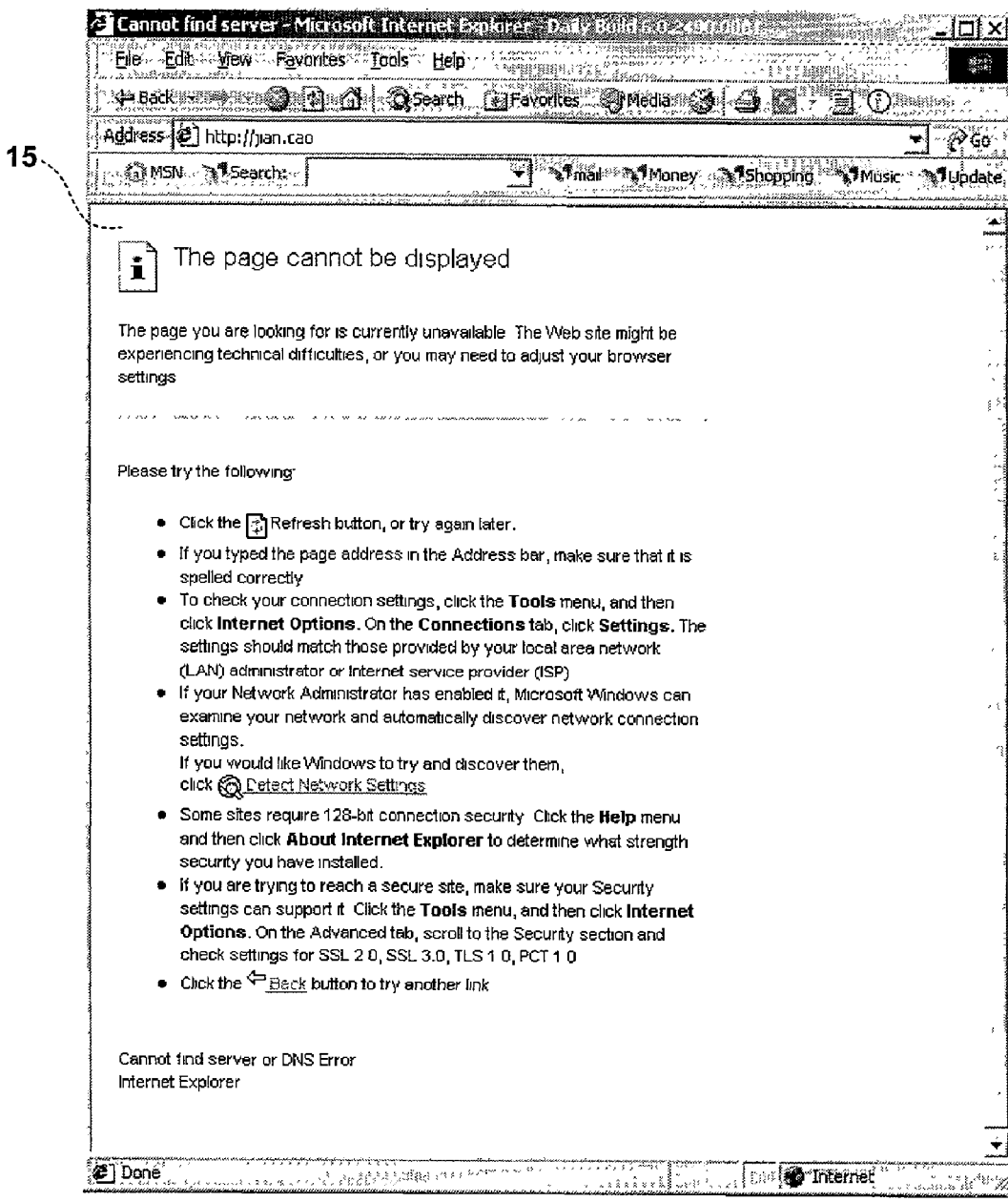
FIG. 1 illustrates an exemplary Web page that is displayed in response to unresolvable URL input in accordance with known techniques.

As mentioned in the background, the number and kinds of opportunities to navigate to one or more URLs when traversing to or from various network locations are proliferating. In this regard, there are an increasing and corresponding number of ways to input a URL in order to navigate to the target represented by the URL. As a result, there is a concomitant increase in the number of errors that can be made when entering such input, whether it be a spelling error, a protocol error, a misnomer, a mistake in organization type, top level domain and the like, acronym designation, general confusion, etc.

In accordance with the present invention, methods and systems are provided that automatically analyze URL input with intelligence, and suggest alternative URLs where a high confidence exists for suggesting them. Capable of supplementing previous systems that can make rudimentary correction of common protocol errors on the client side, e.g., by the browser, the present invention intelligently analyzes the types and kinds of errors that can be made when inputting URLs based on intelligent rules and/or known URLs. The present invention also makes analysis with respect to dynamically updated information from the Internet, including the use of new and popular URLs, cultural or geographical information and the like. The present invention may supplement the URL suggestions with search information from a search engine. The present invention may be in the form of computer executable code that may be co-located with the browser on the same computing device, partially co-located or located on a different device. In this regard, users have an overall better experience in connection with a network-based navigation or search via a URL navigation or search mechanism of the invention.

The invention converts URLs having error(s) into valid alternative ones where a high confidence exists for one or more alternative valid URLs. Parameters and rules for when to make alternative suggestions may be adjusted according to the needs of the application or user making input. The invention additionally provides a plurality of mechanisms by which the user can choose the alternative or related URLs afterwards. Help or technical details for a search on the incorrect URL input may also be solicited.

In various embodiments of the systems and methods for providing URL correction, the present invention advantageously provides: (1) automatic correction of error(s) with high confidence, (2) the use of the corrected versions in providing alternative URL suggestions, (3) the use of multiple sources of URLs for comparison, weighted accordingly, (4) the option for the user to ignore the suggested alternatives and conveniently to remember and modify what the user originally specified and thus navigate to the modified target (5) methods by which a user can view suggestions retrieved from a search engine and (6) automatic correction of error(s) at least one dynamically updated dictionary of Web URLs.

Exemplary Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 3A:
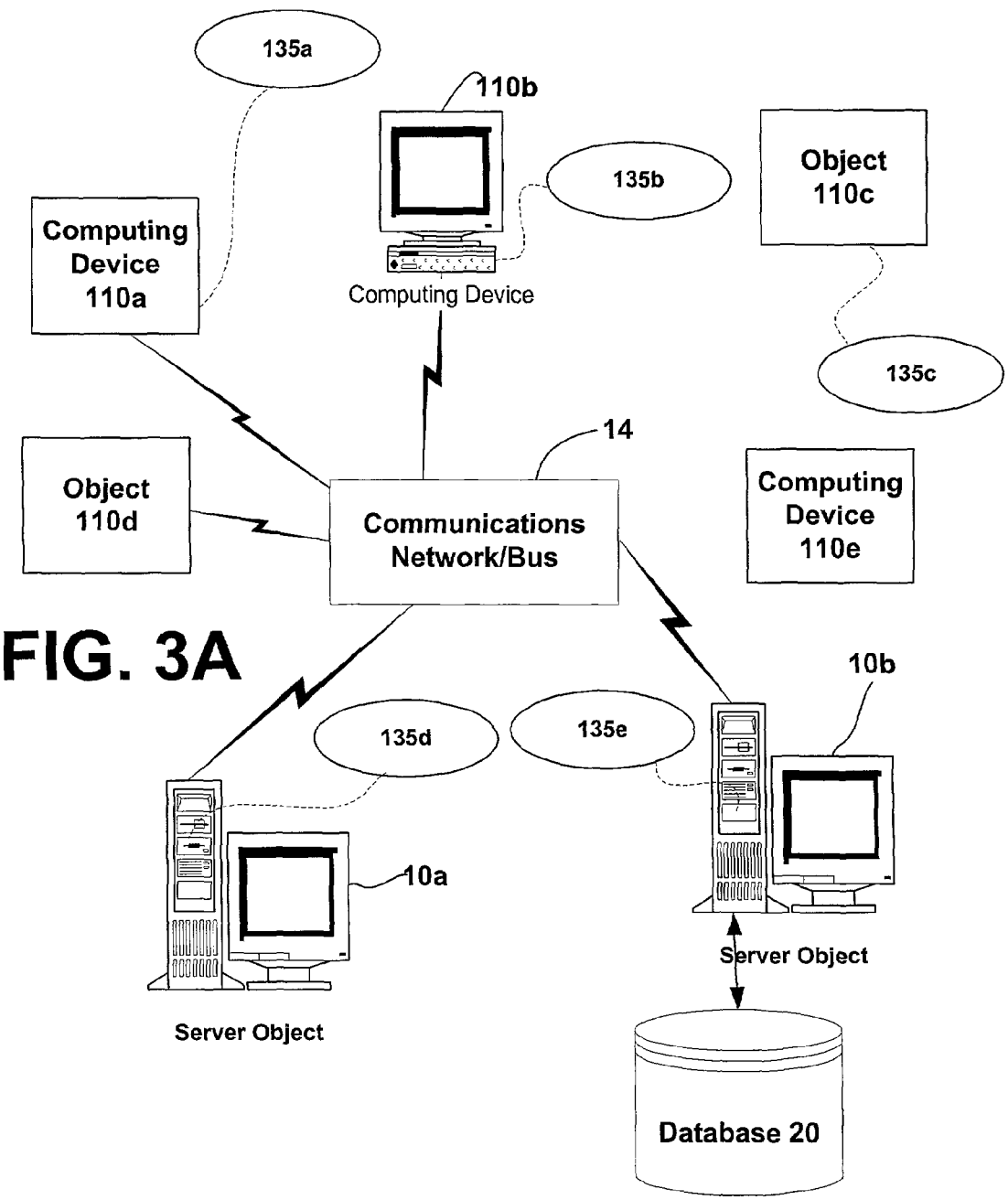
FIG. 3A is a block diagram representing an exemplary network environment having a variety of computing devices in which the present invention may be implemented.

FIG. 3A illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to perform automatic URL analysis when navigating.

In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 or other storage element in accordance with the present invention, such as a database 20 for storing URL or other data of the present invention. Thus, the present invention can be utilized in a computer network environment having client computers 110a, 110b, etc. that can access and interact with a computer network 14 and server computers 10a, 10b, etc. that may interact with client computer 110a, 110b, etc. and other devices 111 and databases 20.

Exemplary Computing Device

Figure 3B:
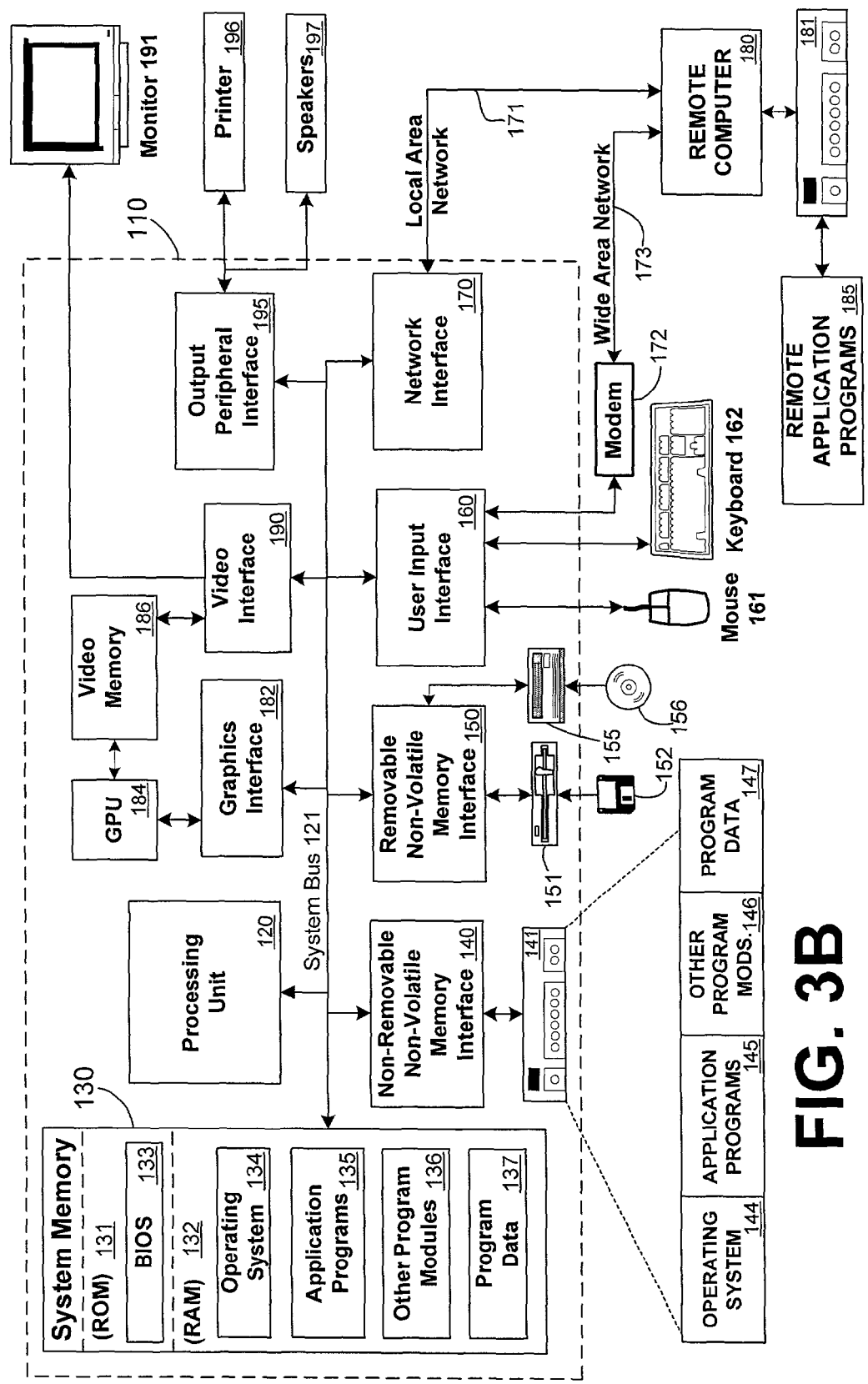
FIG. 3B is a block diagram representing an exemplary non-limiting computing device in which the present invention may be implemented.

FIG. 3B and the following discussion are intended to provide a brief general description of a suitable computing environment in which the invention may be implemented. It should be understood, however, that handheld, portable and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 3B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3B illustrates operating system 134, application programs 135, other program modules 136, and program data 137.

The computer 110 may also include other removable/non-removable, volatile/nonvolatile computer storage media. By way of example only, FIG. 3B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3B provide storage of computer readable instructions, data structures, program modules and other data for the computer 110. In FIG. 3B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3B. The logical connections depicted in FIG. 3B include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3B illustrates remote application programs 185 as residing on memory device 181. It will be appreciated that the network connections shown are exemplary and other means of establishing a communications link between the computers may be used.

.NET Framework

.Net is a computing framework that has been developed in light of the convergence of personal computing and the Internet. Individuals and business users alike are provided with a seamlessly interoperable and Web-enabled interface for applications and computing devices, making computing activities increasingly Web browser or network-oriented. In general, the .Net platform includes servers, building-block services, such as Web-based data storage and downloadable device software.

Generally speaking, the .Net platform provides (1) the ability to make the entire range of computing devices work together and to have user information automatically updated and synchronized on all of them, (2) increased interactive capability for Web sites, enabled by greater use of XML (Extensible Markup Language) rather than HTML, (3) online services that feature customized access and delivery of products and services to the user from a central starting point for the management of various applications, such as email, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well. While exemplary embodiments herein are described in connection with software residing on a server and/or client computer, portions of the invention may also be implemented via an application programming interface (API) for a particular programming language, such that the URL analysis of the present invention may be supported in or accessed through all of Microsoft's .NET languages and services.

URL Correction

The invention adds value to the overall user experience by recognizing when an error in URL input exists, and suggesting alternative URLs based on an intelligent rules-based analysis. Thus, when handling a domain name service (DNS) error, for example, as part of an autosearch component, the invention adds end user value by intelligently helping the user figure out what might be wrong. The invention thus enhances usability and does not significantly affect the amount of time taken to determine the validity of URL input, and in some cases, such as when multi-lingual domain issues are not present, decreases the amount of time taken.

Figure 4:
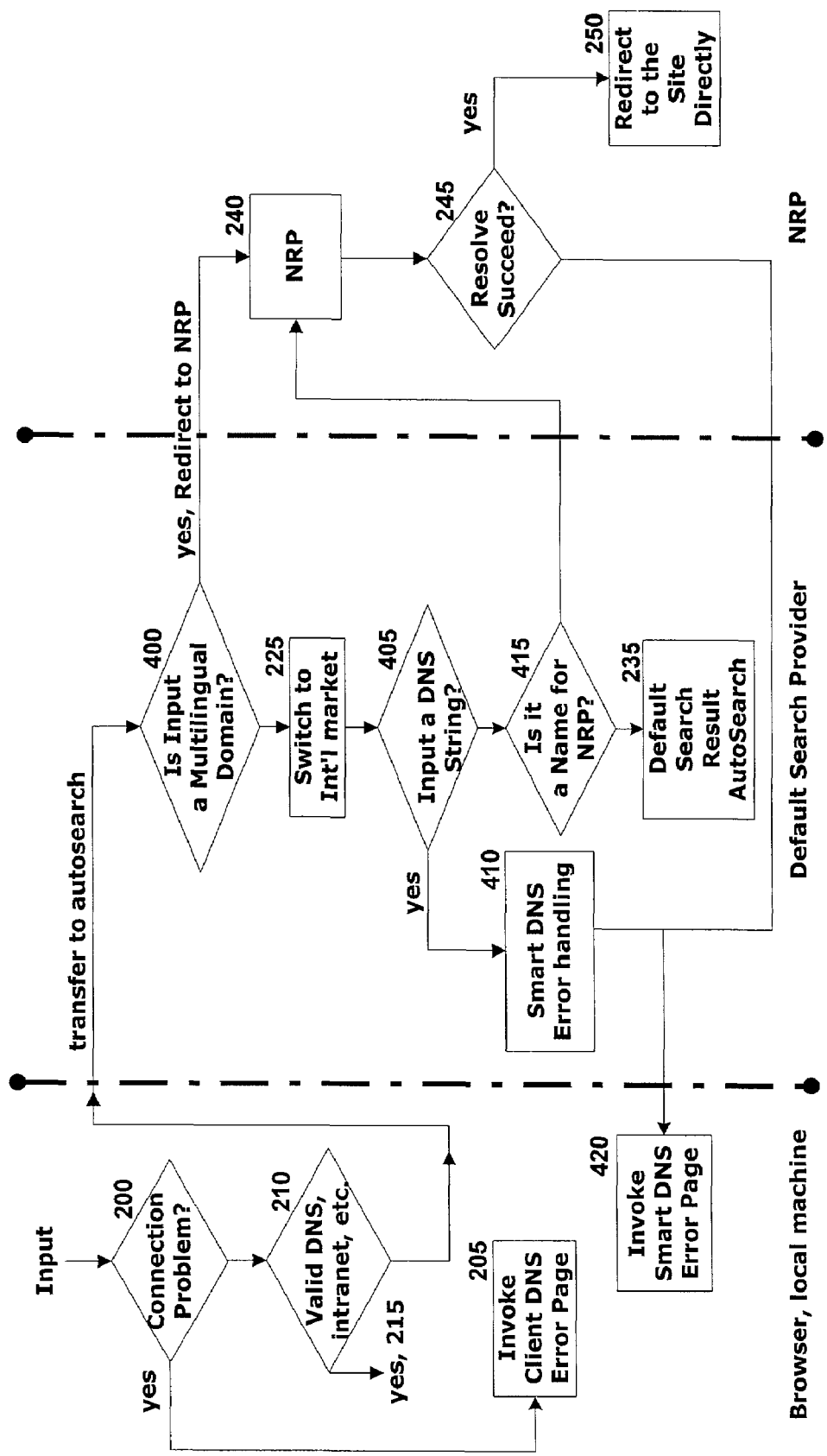
FIG. 4 is an exemplary flow diagram illustrating methods for processing URL input in accordance with the present invention.

As mentioned, the techniques of the invention may supplement techniques wherein rudimentary protocol corrections are made. With reference to FIG. 4, at 200, if it is determined there is a connection problem, then an error page, such as error page 15 of FIG. 1, is invoked and displayed at 205. If the connection is valid, then at 210, it is determined whether there is a valid DNS name for the URL input, a valid intranet location for the URL input, etc. If so, then at 215, navigation to, or search on, the URL input is performed. If not, however, control is transferred to the default search provider. At 400, it is determined whether there are multilingual domain issues that can be effectively handled by NRP 240. If so, then the URL input is sent to NRP 240. If not, then a switch is made to the appropriate international market at 225. Then, at 405, it is determined whether there the URL input is a string. If so, then a smart DNS error handling component 410 handles the error correcting of the invention. If there the URL input is not a string, then at 415, it is determined whether the URL input is a candidate for NRP 240. If so, the input is sent to NRP 240. If not, search results are provided by searching the Web with a search engine with the URL input as the query. If the URL input is redirected to NRP 240, the URL input is checked against known names. A determination is made whether the name can be resolved at 245. If not, then the browser displays the DNS error page 15 at 205. If so, then there is valid URL input and at 250, and the flow is redirected to the site directly.

NRP 240 is advantageous because NRP 240 can handle multilingual domain names, such as Chinese characters, in the domain name. Since the main value that NRP 240 adds is multilingual domain name resolution, the invention adds a step of determining whether or not multilingual domain name resolution issues are present, so that unnecessary trips to NRP 240 are avoided.

Thus, when the browser fails to resolve a URL, i.e., whatever a user has typed in the address bar or other application input, the browser sends the input to the autosearch component of the overall search component. The search component first checks at 400 if the input should be sent to NRP 240 for resolution, and if not, an automatic search is conducted by the autosearch component.

If the URL is sent to NRP 240 and NRP 240 cannot resolve the input, a smart DNS error page is brought up at 420, instead of the standard error page, to bring in intelligence and help the user figure out what is wrong. The presentation of the new error handling page is fast, adds value and provides an overall better user experience.

Thus, in an exemplary scenario, a user types an invalid URL in the browser address bar, such as "bluecowgirls.com/foo". With no connection problems at 200, after the URL is determined invalid at 210, the URL input is passed to the search component. The search component determines that no multilingual domain issues are present at 400, and that the DNS input is a string that can be processed by the smart DNS error handling component 410. Component 410 then returns a smart DNS error page at 420 with suggestions, search options and links to traditional technical information page. Thus, the user can easily understand that there is a mistake in the user input, and is presented with some intelligent suggestions, such as "bluecowgals.com", and links to further search, e.g., links to rodeos, and other technical information.

Advantageously, instead of blindly passing the user typed URL input NRP 240 for multilingual domain name resolution, the invention uses intelligence when deciding to redirect. Thus, the invention provides algorithm(s) to detect that the user typed URL is a likely candidate for a multilingual domain, and only when this is true, is the input redirected to NRP 240. Since, other than the multilingual domain opportunity, NRP 240 cannot handle the user typed URL error, it is wasteful to route to NRP 240 unnecessarily.

While a variety of rules based choices could be implemented to detect a multilingual domain name, in an exemplary embodiment, the definition for multilingual domain name is: (1) the input includes at least one character inside the domain portion that has a code point above 0x0080, although a normalized dot is not counted as above 0x0080, (2) the domain portion does not include normalized space and (3) the domain portion includes at least one normalized period ('.') but the period is not leading or trailing.

Here, the domain portion refers to the portion before the first normalized forward slash '/' (counting back slashes '\' as well). After that, the portion might be a subdirectory, path or parameters, etc., with which the present invention is not concerned.

It is expensive to check all the characters to see if there is at least one which has code point above 0x0080; also it is not cheap to check for normalized dot '.' and space ' '. Since the dot '.' checking can be used in other places such as DNS name checking, for performance reasons, an object is utilized that quickly tests the URL input, such as a utility COM object or specialized dictionary object. Herein, normalization refers to treating extended '.' and space ' ' the same as its corresponding ASCII value.

If the multilingual domain name definition is met at 400, the autosearch component redirects to NRP 240. Some multilingual domain examples that will redirect to NRP 240 according to this step include: "......" and "hello.¢¤Ñ". Some that will not redirect according to this step include: "....", "c.i.a.", ".net", "OK." and "Internet Explorer". Even though the last example, i.e., "Internet Explorer", might be registered at NRP 240, at this stage 400, only multilingual domains are checked. In such case, after the autosearch component passes "Internet Explorer" through steps 225 and 405, step 415 of the main search logic checks whether the term is a real name, and thus there is still opportunity to resolve "Internet Explorer" later on.

With respect to step 405, additional logic is put in place to determine whether the input is a DNS name. This involves providing a suitable definition of what is to be considered a domain name by the search component. In an exemplary definition, a domain name meets the following requirements: (1) the input includes a normalized period '.', (2) the normalized period '.' is neither leading, nor trailing, and if it is leading or trailing, the input also includes at least one more dot inside the string and (3) if the input includes the normalized space ' ', the input must also contains a string ".com", ".net", ".org", ".edu" or other top level domains as they are further recognized as valid URL input.

According to the above set of rules, DNS name examples include "Microsoft .com", "microsoftt.com" and "1.1.bean" whereas non-DNS name examples include "..", "c.i.a." and "1.1. bean". The non-DNS name examples are sent to the normal search at 235.

As for the smart DNS error handling component 410, when the input arrives, due to steps 400 and 405, the input is considered a DNS name that has a handling error. The invention uses intelligence and makes DNS name suggestion(s) in accordance with the intelligence, instead of just calling the standard IE DNS error page 15 of FIG. 1.

In one embodiment, if there is no high confidence suggestion for alternative URL input, less than the full smart error page may be displayed; for instance, a search section may be displayed without the alternative URL suggestions.

For search purposes such as the search 235, in accordance with one embodiment, mini search results are displayed, whereby only a limited number of search results are displayed, such as three results. Although a non-limiting choice, three search results provides a good tradeoff between the user receiving highly germane results and the user receiving a full blown search results page.

As for intelligence built into the DNS error detection, the following scenarios are illustrative. The scenarios that the intelligence of the invention is designed to handle include (1) typos, such as missing/incorrect URL prefix/postfix, wrong prefix/postfix, e.g., "msft.ocm", typos with a space inside, e.g., "microsoft .com", a user types a URL without prefix, e.g., "dogcatcher.com", (2) user misspellings of URL input, e.g., "microsoftt.com", (3) user guesses at a valid URL, such as when a user is not sure about a URL, but types an incorrect guess anyway, e.g., "www.whatismsn.com", "Att&t.com" or "ask+jeeves.com" and (4) user misspellings of a wrong domain with subdirectory/path where a user types a URL which has a typo in the domain name, e.g. "www.microsoft-t.com/msdn". It is noted that the difference between the scenario of (4) is different from the scenario of (2) in that the scenario of (2) does not have a path or subdirectory.

Some common errors that the intelligence of the invention fixes include: postfixing ".com" to "www.yahoo", prefixing "www" to "hotmail.com", changing "ww" to "www", converting commas to periods, deleting trailing commas, converting the invalid input "www.nasa.com" to "www.nasa.gov" and changing "wwww" to "www".

These rules are incorporated into a suggestion rules table, and may be based upon data from an offline URL dictionary, from actual use of the Internet based upon common errors and the like. In this way, the invention provides a suggestion rules table, which contains clues about how to "correct" problems with the URL input, which when combined with a spellchecker URL dictionary, yields a high confidence of valid alternative suggestions.

There are also rules that can be integrated into the spellchecker itself, for example, ww.→www., or .com→.gov. Also, the preprocessing or filtering of invalid characters corrects some problems as well, such as correcting at&t.com→att.com because '&' is an invalid DNS domain name character which cannot be correct. In one embodiment, for efficiency, there are no duplicate rules between the suggestion rules table and the dictionary modeling, i.e., a rule is built either in the table(s) or the dictionary(ies).

In one embodiment, if a rule can be implemented by the spellchecker, the rule is implemented by the spellchecker instead of the suggestion rules table. In general, more sophisticated logic that cannot be handled by the spellchecker lookup alone are implemented via the rules table. The artificial intelligence is based upon intuition and practice in some cases, such as in international markets where special rules can be in place to deal with the international environment.

In various embodiments, the suggestion rules table is developed based on experience, the DNS error log and an ongoing search log maintained in accordance with the invention. In one embodiment, the rules are grouped together provided that they do not conflict in order to reduce the number of calls made to the spellchecker.

Current top US level domains include ".com", ".net", ".gov", ".edu", ".org", ".mil", ".int", ".tv" and ".ws". There will also be seven (7) new TLDs, which can be accommodated with the others: ".aero", ".biz", ".coop", ".info", ".museum", ".name", ".pro" which represent the air transport industry, businesses, cooperatives, unrestricted use, museums, for registration by individuals, and accountants, lawyers and physicians, respectively. The ".biz" and ".info" TLDs are unsponsored, whereas ".aero", ".coop", ".museum", ".name" and ".pro" TLDs are sponsored. These can be customized for the suggestion rules table for international markets. Since the domain is tied into markets, the suggestion rules table should be "translated" into local markets.

An exemplary rule for the rules based table is appending a ".com" top level domain to the URL input, whereas the spellchecker can correct the input for postfixes of ".net", ".gov". Another rule for the rules based table might be: where there is no prefix "www.", or an incorrect prefix "ww." or "wwww.", the input is corrected to "www.". Thus, "www.hotmail" will be converted to "www.hotmail.com" and "www.nasa" will be converted to "www.nasa.com" by the rules based table. Similarly, "dogcatcher.com" will be converted to "www.dogcatcher.corn" and "ww.hotmail.com" will be converted to "www.hotmail.com" by the rules based table. Lastly, there are a variety of scenarios wherein human intelligence can be applied to come up with a rule. For example, "www.hotmail.com.au" may be converted to "Ninemsn.com.au/hotmail" by the rules based table based upon international knowledge.

Some items are more suited for the rules based table, such as the previous example, i.e., the spellchecker by itself would have a difficult time making the correction: "www.hotmail.com.au" to "Ninemsn.com.au/hotmail". In an exemplary embodiment, with respect to the conversion from "www.nasa" to "www.nasa.com", the spellchecker will in turn correct "www.nasa.com" to "www.nasa.gov". Thus, a myriad of balances may be stricken between rules implemented via the rules based table and rules implemented by the spellchecker.

There are thus specific hard coded rules such as "www.hotmail.com.au" to "Ninemsn.com.au/hotmail" and generic rules, such as ".com" to ".co.jp" in Japan. The specific rules are string substitution, etc., and they are less computationally expensive and generally come from logs demonstrating certain behavior. Generic rules tend to be more expensive, and are generally integrated into the spellchecker.

In one embodiment, when making suggestions, a list or database of frequent or common URLs is referenced. At runtime, the list or database can be referenced knowing that such URLs are safe URLs to suggest. These URLs can be accommodated with a lexicon of the URL dictionaries references. In this regard, a top URL list may be constructed or adopted from reports, third party data about Internet use or other observations of Internet behavior which yields commonly trafficked Web sites. In one embodiment, the top URL list is implemented as a user dictionary for the spellchecker. The top URL list is updated periodically, such as monthly, to keep it fresh. The top URL list may also be designed such that it accommodates a blacklist (file) of URLs to exclude certain socially undesirable domains.

The spellchecker may be implemented such that there are no duplicate entries, such that entries have an optional weight, and an optional frequency assignment. Also, some sites do not support "www." and some have "www1.", etc. and so these issues are taken into consideration. While the top URL list's sites have good scope of coverage, the coverage is not enough. In order to successfully suggest alternative URLs, the spellchecker dictionary includes large URL coverage from one or more secondary sources. Thus, other lists including tens of thousands of URLs can be used as a second URL list source. In one embodiment, the secondary dictionary serves as a fall through for the top URL list in case the top URL list is not sufficient.

The full Internet DNS database is huge, estimated at 20 million URLs. While the full Internet database could be accommodated, in one embodiment, the computational expense is such that there is a little extra value added by the full Internet DNS database when most problems can be handled by the primary and secondary lists.

The complete Internet DNS domain names can be downloaded from DNS name servers, which is snapshot of all Internet DNS domains names on the Internet. If a domain name is not in this database, it is an invalid one in theory (ignoring latency of deleting/adding etc). The top URL list should be excluded from this Internet DNS URL database when building this database. The main reason is the top URL list is much more valuable and smaller, and this Internet DNS database is used as a fall through from the top URL list and secondary lists.

With respect to spellchecker dictionary rules, besides the lexicon for spellchecker, the spellchecking rules for the URL spellchecker dictionary can be customized. For example, substitutions can be assigned a penalty score wherein the lower the penalty score, generally the higher confidence that is associated with the substitution. For example, "." replaces a "," with a penalty of minus twelve, and "ain't" replaces "isn't" with a minus five. For other examples, ".mil" replaces ".com" with a high penalty score whereas ".gov" replaces ".com" with a low penalty score.

Figure 5A:
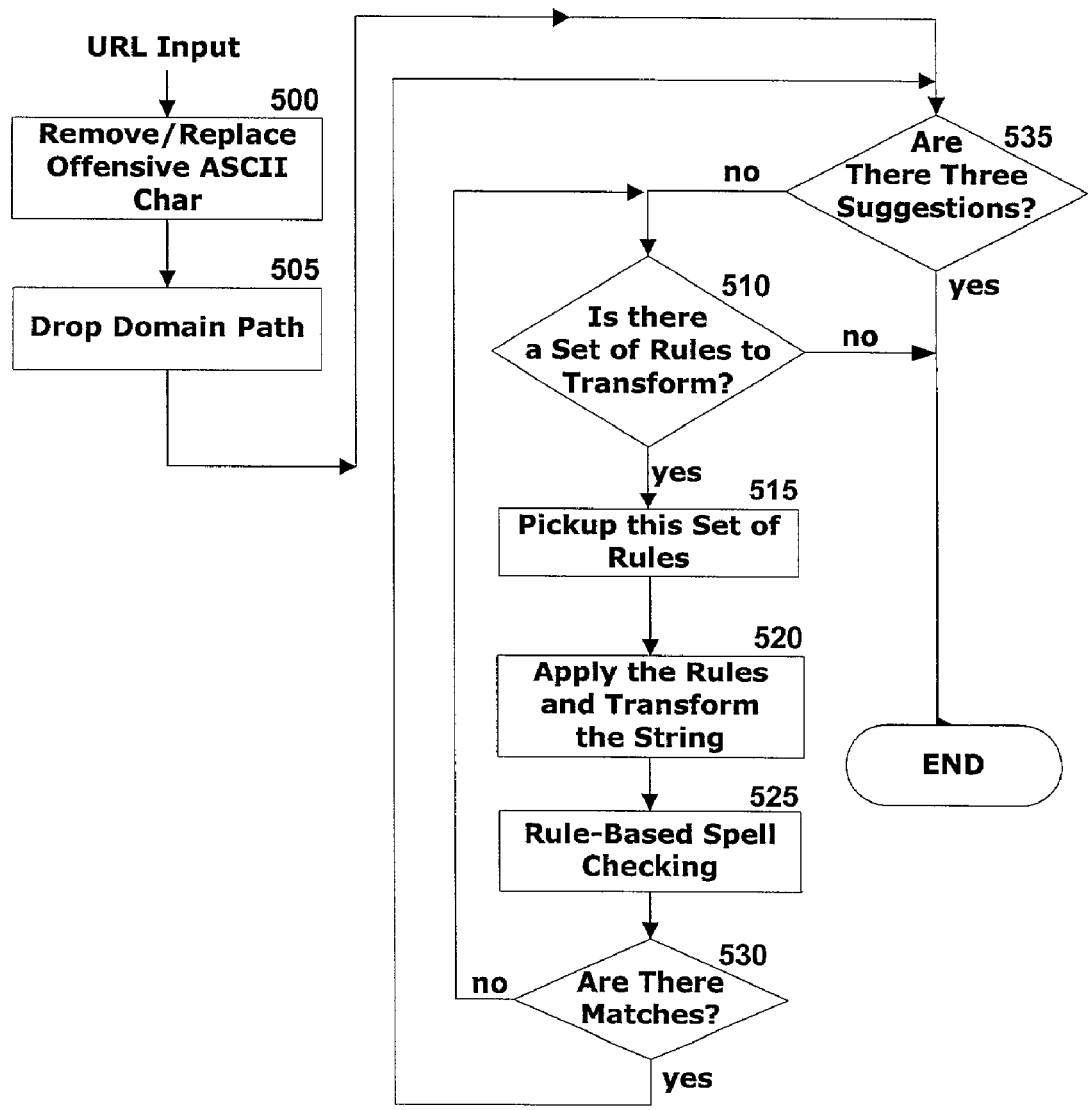
FIG. 5A is an exemplary flow diagram illustrating methods for processing URL input to form alternative suggestions in accordance with the invention.

FIG. 5A illustrates exemplary suggestion processing in accordance with the invention. Since the top URL list is highest quality, the local copy of the Internet DNS URL database is treated as a fall through database in most embodiments, i.e., if there are already three suggestions from the top URL list or secondary list, there is no need to check against the local copy of the Internet DNS URL database. At 500, offensive ASCII characters of the input, such as "&", are removed or replaced. At 505, the domain path is dropped. After such preprocessing, at 510, a determination is made whether there is a set of rules to transform the input. If so, then at 515, the set of rules is received. At 520, the rules are applied and the URL input is transformed. At 525, the rules based spellchecking of the invention is applied vis-à-vis the dynamic and static stores of URL data. At 520, a determination is made whether there are any matches for the input data. If not, then the flow returns to 510 to see if there is another set of rules that could apply to the input data. If there are matches, then at 535, a determination is made as to whether there are X number of matches, such as three matches. If there are X matches, then enough suggestions have been obtained and the flow ends. If there are not yet X matches, then the flow returns to 510 to see whether there are more rules that can be applied. If there are no more rules to be applied, then the flow ends. It will be appreciated that in any flow diagram, steps can be removed or rearranged with equivalency to other such arrangements, and that FIG. 5A is for descriptive purposes.

Before make any suggestion, in one embodiment, the invention parses out the subdirectory/path after DNS domain name, and only makes suggestion about the domain name since the subdirectory/path becomes too complex and has less resources available with which to work. If the DNS domain name is correct and subdirectory/path is wrong, current browsers already handle the scenario.

Where there is a subdirectory/path that is incorrect, in one embodiment of the invention, the subdirectory/path is dropped and only the DNS domain name is suggested. In another embodiment, after suggesting the DNS domain name, the subdirectory/path is placed back into the string as a complete suggestion. The first of these embodiments is more desirable where a higher confidence suggestion is desirable since there is little control over the validity of the subpath, particularly when the domain name starts as being invalid.

With respect to 505, invalid DNS name characters are filtered so the input is consumable by the suggestion rules table and/or speller checker. Valid DNS characters include: "–", ".", "/" and "\". Invalid DNS characters include: "!", """, "#", "$", "%", "&", "'", "(", ")", "*", "+", "<", "=", ">", "?", "@", "[", "]", "{", "|", "}" and DNS characters replaced with a "." include: ",", ":" and ";". Previous characters are remembered to avoid double dots '.', i.e., if the previous character is a dot '.', the consecutive dot is dropped including any substituted dots. If there is any leading dot, the leading dot is dropped as well.

When looking up in the top URL list, a threshold is used which the spellchecker can use as well. The threshold may determine how many results are returned by a single operation. For example, if the threshold is low, the first rule lookup may return 3 results in spellchecker lookup operation; thus, the second rule is unnecessary because enough have already been obtained. In some case, the second rule may make more sense. The threshold helps to set the bar for the number of results returned for a respective rule.

In one embodiment, after traversing the suggestion rules table, if there are not enough suggestions, a straight URL spellcheck is conducted. In case of a purportedly valid site being down, the feature is turned off and a browser DNS error page, such as error page 15 is displayed.

Figure 5B:
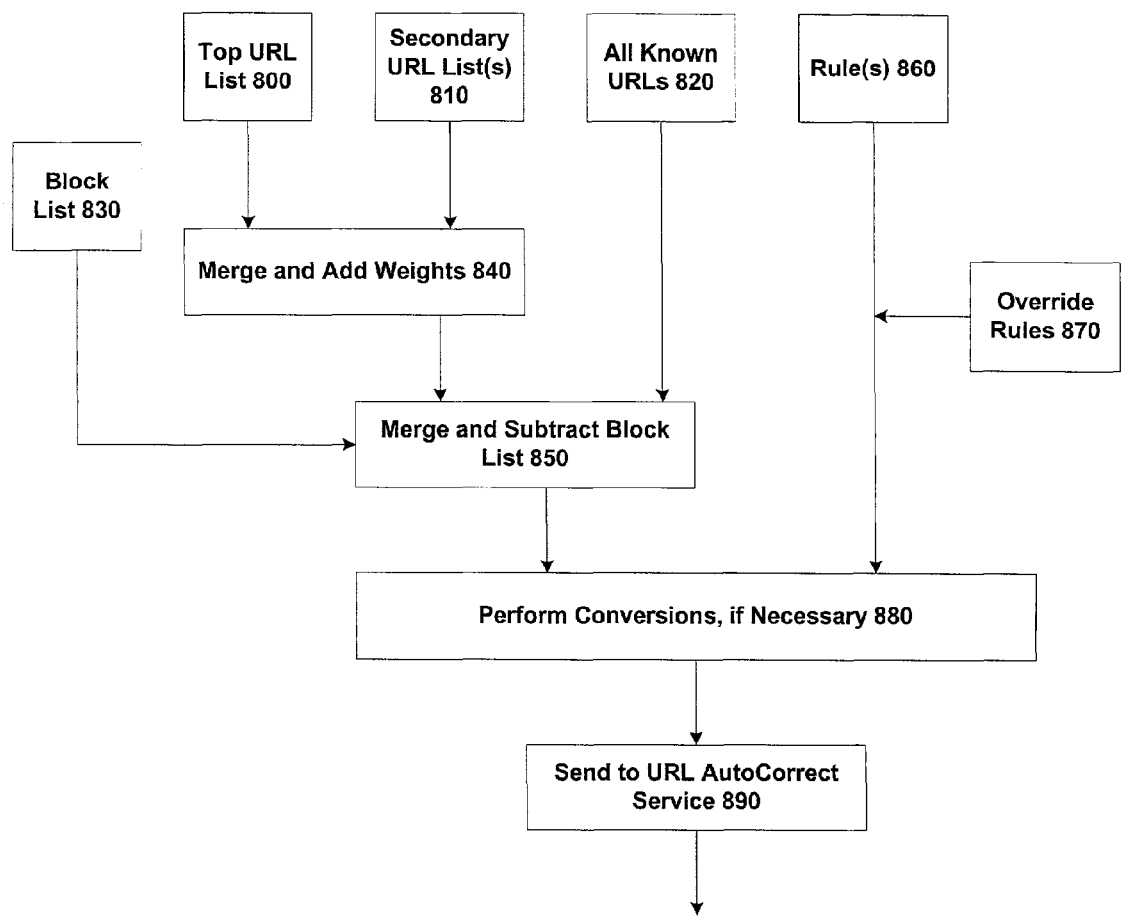
FIG. 5B is a block diagram illustrating exemplary organization of URL correction data in accordance with the invention.

FIG. 5B illustrates an exemplary configuration of the URL database(s) and rules for sending or input to the URL analysis mechanism of the invention. As illustrated, top URL list 800 and secondary list(s) 810 are merged and weighted accordingly at 840. All URLs from a comprehensive URL list 820 are also merged at 850. Databases 800, 810 and 820 may be accesses separately as well. Any undesirable URLs are excluded from the process with block list 830. Any one or more of lists 800, 810, 820 and 830 may be dynamically updated. Rules 860 are designed with intelligence and are described in more detail elsewhere herein. These rules 860 may be specified as part of the rules based table and also may be specified for a spellchecker component. Override rules 870 may also be specified which override any other rules. Any conversions to the data that may be necessary are performed at 880. At 890, the data is input to the URL analysis mechanism of the invention.

Thus, the present invention provides intelligent analysis of URL input to display a predetermined number of alternative URL suggestions.

In addition to displaying the URL suggestions, a mini search, or not full blown search, is performed by receiving the first Y, such as 3, search results from the search engine of choice, which may provide decent alternative suggestions within, i.e., this search information can be very useful in steering a user to the proper location. This is beneficial when the suggestion rules and URL spellchecker do not work well. This also gives the user the option to turn the smart DNS error page into a real full blown search page. In one embodiment, only titles embedding the URL as links are shown. If there were no URL suggestions from the smart DNS handling component, then the search is still performed to provide search suggestions.

In one embodiment, if no suggestions result from either URL suggestion or the mini search, this is undesirable and so in one embodiment, the spell checking is tried again by lowering the spellchecker threshold, hoping suggestions result. If there is further failure, a "no results" or similar message is conveyed.

In another embodiment, during mini search, the domain name is first transformed into a query more suited to searching. For example, the prefix and postfix can be stripped off before sending the query. For example, if a user types "n'sync.com" which appears natural, the ".com" can be stripped and then "n'sync" is sent to the query engine.

During mini search, one query is sent to get Y, such as three, results, instead of transforming the domain name by three methods, and sending three queries. A blacklist of query terms, such as socially undesirable terms, may also be accommodated during the mini search.

Once the URL suggestions and related search terms are provided, an error page user interface (UI) is displayed showing options and suggestions. The UI provides enhanced usability to help users easily find information.

This standard DNS error resource page 15 screenshot is illustrated in FIG. 1. The screenshot is client code in the local machine's resource file and static. The present invention improves upon this static display in a variety of ways.

Figure 6A:
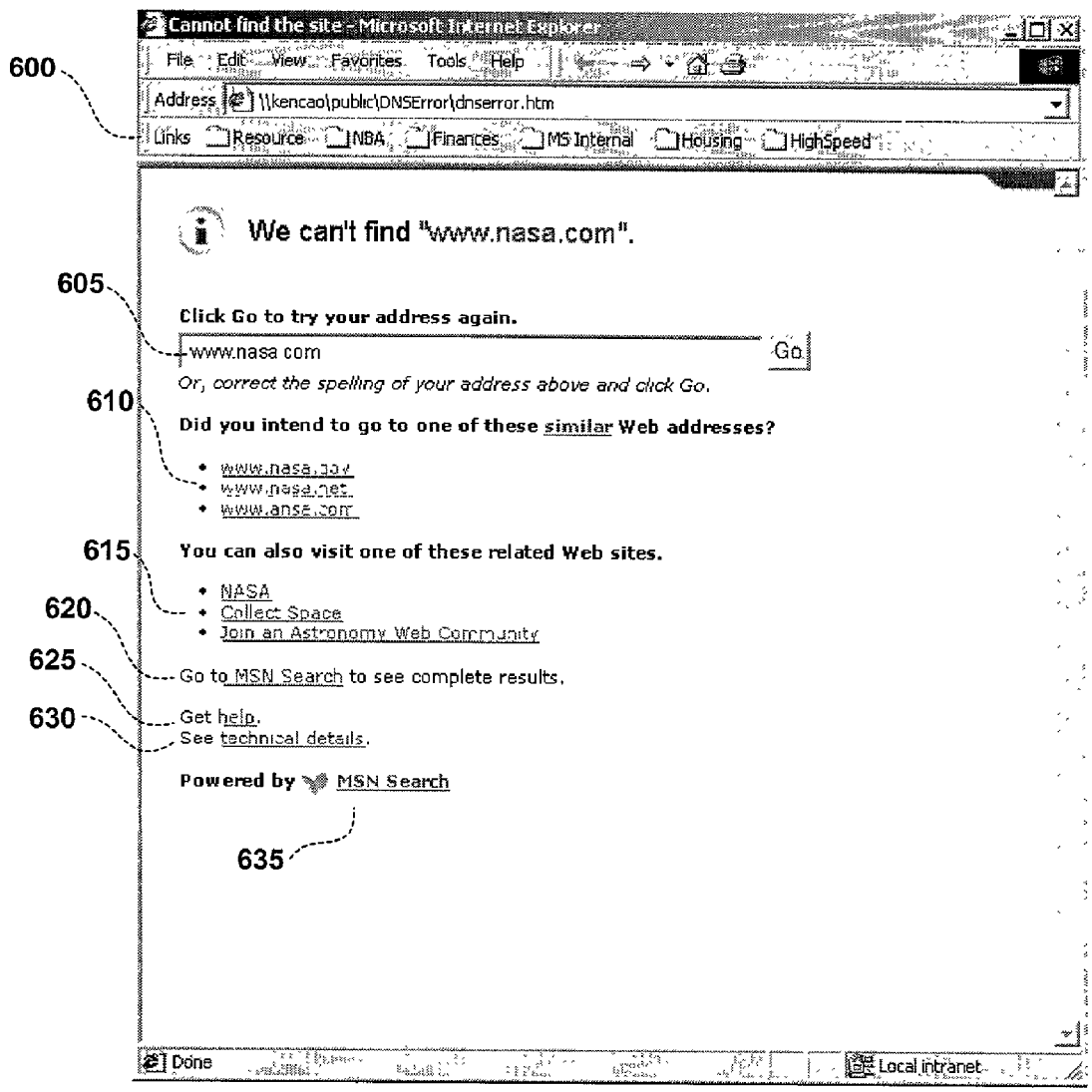
FIGS. 6A through 6C illustrate exemplary user interface screenshots for displaying alternative URL suggestions to the user in accordance with the invention.
Figure 6B:
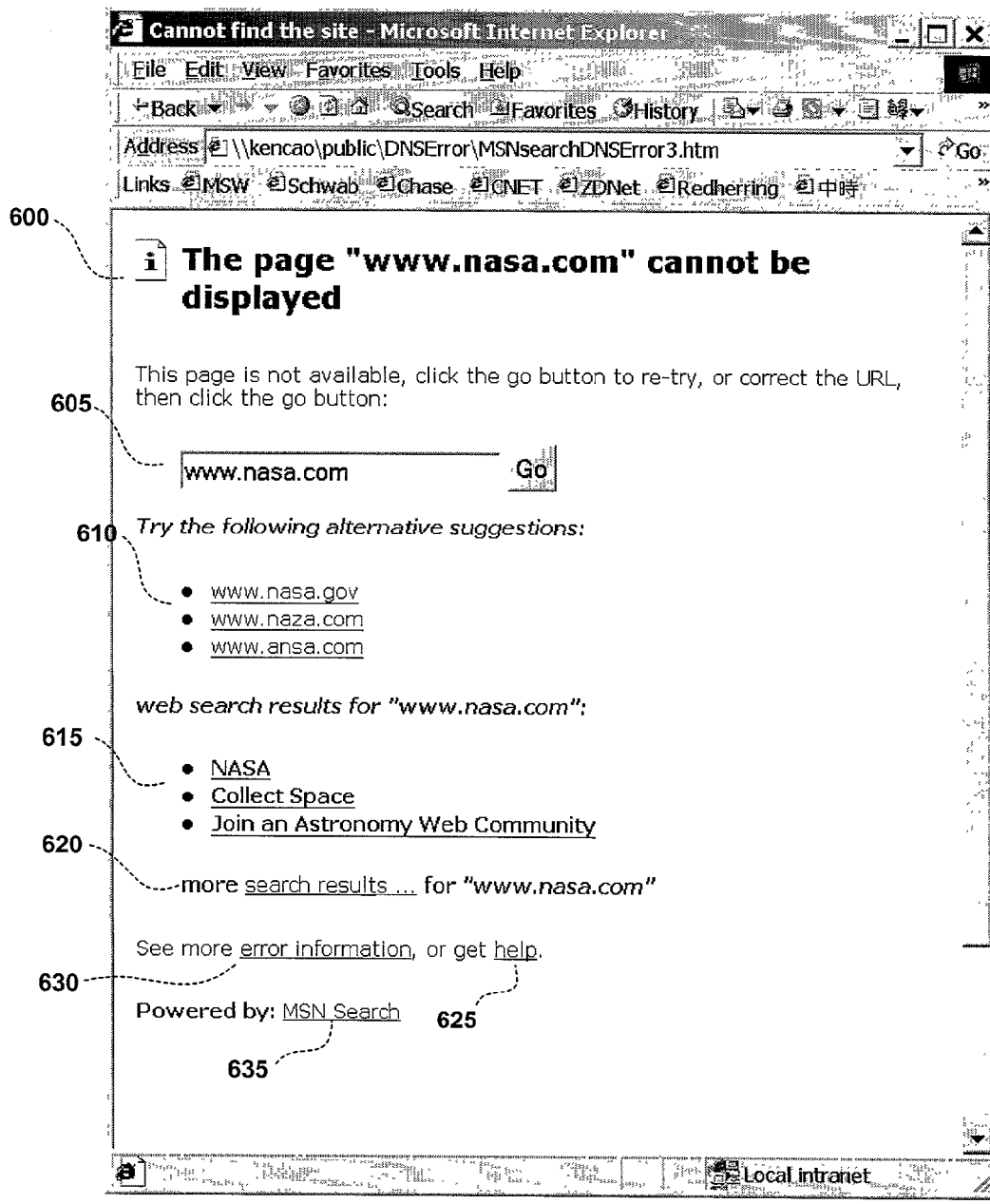
Figure 6C:
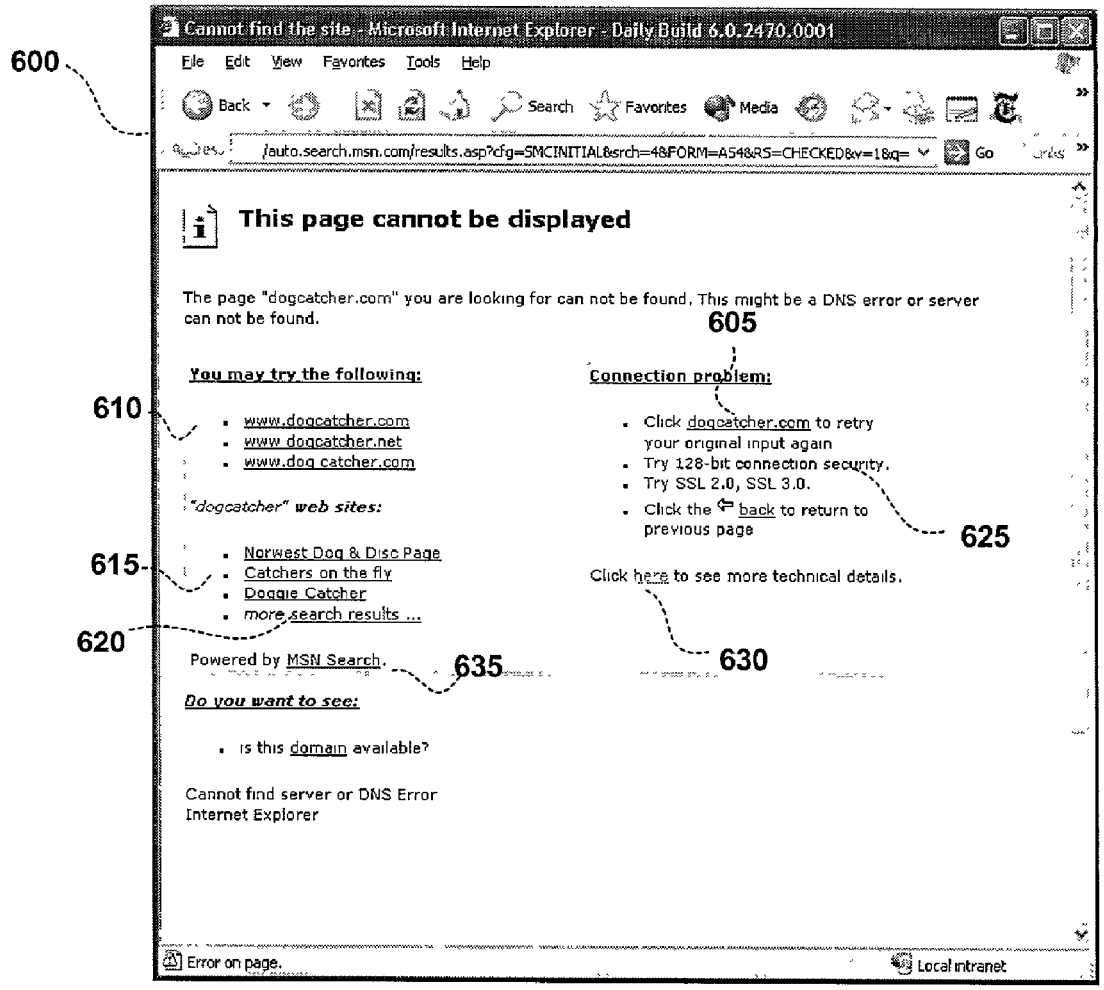

FIGS. 6A through 6C are exemplary layouts for a smart error page 600 in response to the error in input "www.nasa.com" which should be "www.nasa.gov", with NASA being a government entity and not a company. Section 605 is the text-based, or other, input portion containing the incorrect URL input, noting that the query could not be found. With FIGS. 6A and 6B, the idea is to simulate the address bar since the address bar is taken over by the search URL, so that an advanced user can quickly fix their typo or retry. If section 605 is retried again without alteration, however, a navigation to, or search on, the URL input is retried. A "go" button enables retry or dispatch of the entering of new input. Section 610 displays the alternative URL suggestions in accordance with the intelligent analysis of the invention. Other "similar" URLs are thus displayed, indicating to the user that the addresses were found by locating other addresses like the input URL. Section 615 displays the mini search results in accordance with the invention. For example, topics relating to NASA might be space exploration, rockets or astronauts. A range of information may be displayed in the search results 615, anywhere from merely the title link to all search result fields, such as title, description, URL, instead of just title.

Figure 7:
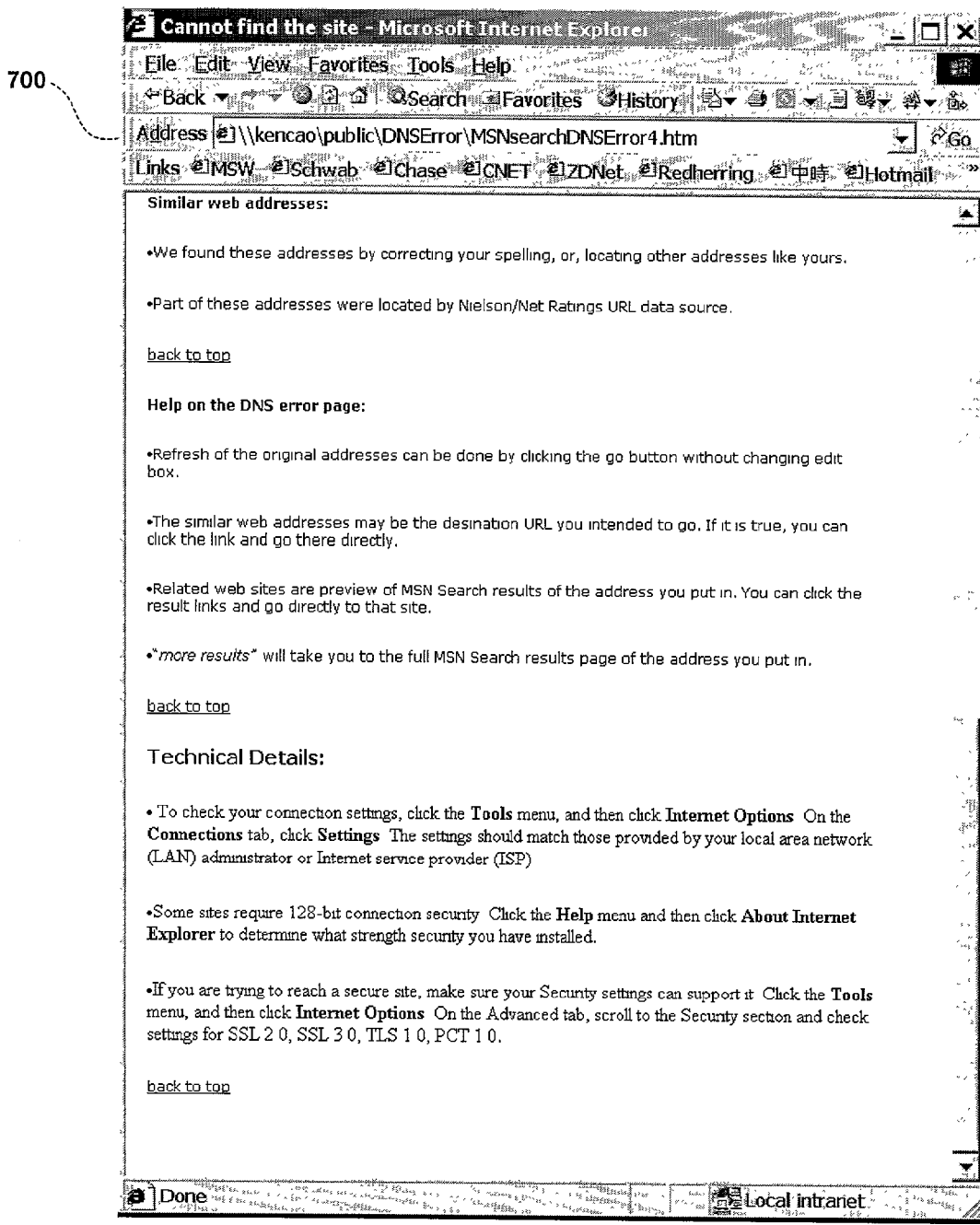
FIG. 7 illustrates an exemplary user interface screenshot for displaying help and/or technical information in accordance with the screenshots of FIGS. 6A through 6C.

Link 620 enables full blown search results. Link 625 enables help information to be displayed and link 630 enables technical details to be displayed. Link 635 goes to a search home page. UI 600 may omit sections when there are no suggestions/results. In one embodiment, an exemplary help related and technical details page 700 as illustrated in FIG. 7 is appended to the end of the page 600 when one of the links is clicked. After viewing the help or technical details, when user clicks the "back to the top", the focus returns to the main page 600.

The user behavior associated with the suggestions, corrections, and related items can be tracked for further rule improvements, and/or for reporting user behavior and trends.

Figure 8:
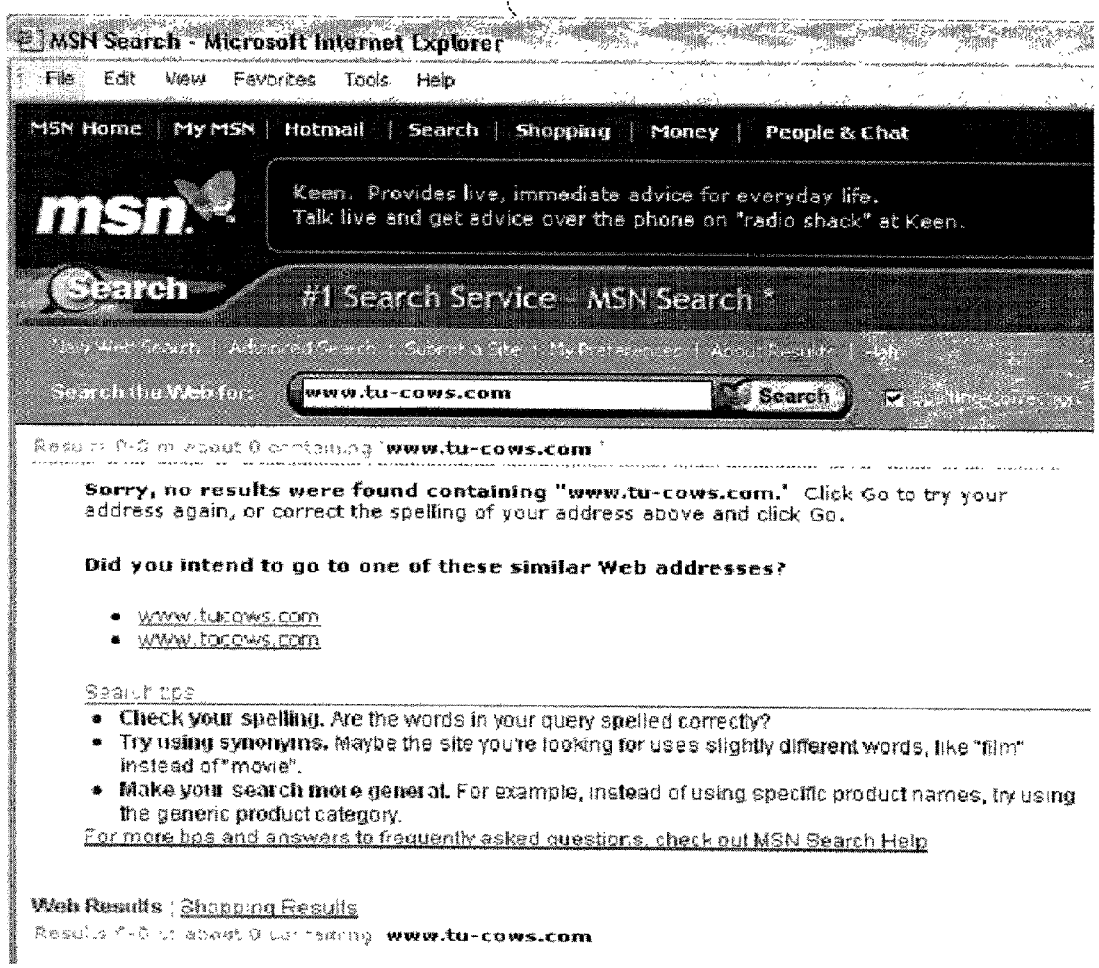
FIG. 8 illustrates an exemplary user interface screenshot showing correction of URL input in the context of a search service in accordance with the invention.

As mentioned, the invention is not limited to any one URL input mechanism, but rather the invention applies to any service which receives URL input. In this regard, FIG. 8 shows an exemplary user interface screenshot 800 illustrating correction of URL input in the context of a search service in accordance with the invention.

As mentioned above, while exemplary embodiments of the present invention have been described in connection with various computing devices and network architectures, the underlying concepts may be applied to any computing device or system in which it is desirable to perform runtime URL input analysis. Thus, the techniques for autocorrecting URL entries in accordance with the present invention may be applied to a variety of applications in which URL data is processed at runtime. One of ordinary skill in the art will recognize that values for threshold settings, rules, weights, penalties and other parameters and settings in accordance with the present invention are design choices that may vary from application to application depending upon the tradeoffs that are implicated. Further while particular names for software components and URLs are utilized herein for distinguishing purposes, any name would be suitable and the present invention does not lie in the particular nomenclature or Web site utilized.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the runtime URL analysis of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the URL analysis capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of URL input in an address bar, one skilled in the art will recognize that the present invention is not limited thereto, and that the methods of URL analysis and correction, as described in the present application may apply to any computing device or environment, such as a gaming console, handheld computer, portable computer, etc., whether wired or wireless, and may be applied to any number of such computing devices connected via a communications network, and interacting across the network. Anytime a URL is input to a computing system by a user or application, the techniques of the invention may apply. For example, both navigation services and search services are contemplated, although the invention is not limited thereto. Moreover, it is noted that in many of the above-described embodiments and some of the claims below, the term URL is utilized, even when merely describing the correction of the domain name portion of the domain name system (DNS). While many embodiments operate to correct the domain name portion of the URL, because the domain name portion is recognized in such embodiments, an analysis of the entire URL is nonetheless performed. Thus, the invention is broadly described as automatically analyzing and correcting URL input, even where merely correcting a domain name. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. In a computing system, a method for providing automatic universal resource locator (URL) analysis in connection with a process implicating a URL input mechanism, comprising: receiving URL input in a computing device; determining whether the URL input is valid; when the URL input is invalid, detecting whether said input is a likely candidate for multilingual analysis, further if said input is a likely candidate for said multilingual analysis, performing intelligent rules-based analysis including said multilingual analysis for identifying the invalid aspects of the invalid URL input; and displaying a smart error page comprising a valid alternative URL obtained from at least one database of known URLs, wherein the at least one database of known URLs is a local copy of a portion of the Internet DNS URL database, the local copy updated dynamically for affirming the validity of the known URLs and for generating a blacklist of URLs to exclude socially undesirable domains, the smart error page further comprising a partial search result comprising a name of a topic related to the invalid URL input, and a link that when asserted provides an extensive listing of search results related to the invalid URL input.

2. A method according to claim 1, wherein the at least one database of known URLs includes a top URL list checked before any other database.

3. A method according to claim 2, wherein the at least one database of known URLs includes a secondary list which is analyzed after the top URL list if at least one alternative URL is not found based on an analysis of the top URL list.

4. A method according to claim 3, wherein the at least one database of known URLs includes a complete list of URLs which is analyzed after the secondary list if at least one alternative URL is not found based on an analysis of the secondary list.

5. A method according to claim 1, further including preprocessing the URL input to at least one of (1) remove non-domain name service (DNS) characters (2) to replace non-DNS characters and (3) to correct an error in protocol.

6. A method according to claim 1, wherein the computing device includes a browser and the is URL input intended for one of navigation to a Web site and search on a Web site.

7. A method according to claim 1, further including performing a search with the URL input as a query and displaying the results of the search on the error page, the results of the search comprising the name of a website pertinent to the URL input.

8. A method according to claim 1, further including displaying a link on the error page, which link, if asserted by the user, retries the original URL input.

9. A method according to claim 1, further including tracking user behavior in response to the display of the error page.

10. A method according to claim 1, wherein the at least one database includes URLs that are weighted according to their popularity, wherein data for determining popularity is obtained from a report on Internet usage.

11. A method according to claim 1, wherein said rules based analysis includes applying rules from a rules based table.

12. A computer readable medium having stored thereon a plurality of computer-executable instructions for performing the method of claim 1.

13. A method according to claim 1, wherein the at least one database of known URLs includes a dynamically updated database of current URLs.

14. A method according to claim 1, wherein the at least one database of known URLs includes a top URL list checked before any other database.

15. A method according to claim 14, wherein the at least one database of known URLs includes secondary list which is analyzed after the top URL list if at least one alternative URL is not found based on an analysis of the top URL list.

16. A method according to claim 15, wherein the at least one database of known URLs includes a complete list of URLs which is analyzed after the secondary list if at least one alternative URL is not found based on an analysis of the secondary list.

17. A method according to claim 1, wherein the at least one database includes URLs that are weighted according to their popularity.

18. In a computing system, a method for providing runtime automatic universal resource locator (URL) analysis and suggestion in connection with a service accessed from a client computing device utilizing a URL input mechanism, comprising: providing a URL input to the URL input mechanism of the client computing device; determining whether the URL input is valid and if invalid, detecting whether said input is a likely candidate for multilingual analysis, further if said input is a likely candidate for said multilingual analysis, transmitting said URL input to a server computing device for intelligent rules-based analysis, including said multilingual analysis, for identifying the invalid aspects of the invalid URL input; and displaying a smart error page comprising a valid alternative URL obtained from at least one database of known URLs, wherein the at least one database of known URLs is a local copy of a portion of the Internet DNS URL database, the local copy updated dynamically for affirming the validity of the known URLs and for generating a blacklist of URLs to exclude socially undesirable domains, the smart error page further comprising a partial search result comprising a name of a topic related to the invalid URL input, and a link that when asserted provides an extensive listing of search results related to the invalid URL input.

19. A method according to claim 18, further including preprocessing said URL input.

20. A method according to claim 19, wherein said preprocessing includes preprocessing the URL input to at least one of (1) remove non-domain name service (DNS) characters (2) to replace non-DNS characters and (3) to correct an error in protocol.

21. A method according to claim 18, wherein the client computing device includes a browser and the URL input is URL input intended for one of navigation to a Web site and search on a Web site.

22. A method according to claim 18, wherein the smart error page further comprises a link that is assertable by a user for re-trying the original URL input.

23. A method according to claim 18, further including tracking user behavior in response to the display of the error page.

24. A method according to claim 18, wherein said rules based analysis includes applying rules from a rules based table.

25. A method according to claim 18, wherein said rules based analysis includes applying rules to the analysis based upon at least one known URLs database.

26. A computer readable medium having stored thereon a plurality of computer-executable instructions for performing the method of claim 18.

27. A method according to claim 18, wherein said server computing device performs analysis based upon at least one database of known URLs.

28. In a computing system, a method for displaying alternative suggestions for an invalid universal resource locator (URL) input, comprising:
   determining whether the URL input is valid and if invalid, detecting whether said input is a likely candidate for multilingual analysis;
   analyzing the invalid URL input based upon intelligent rules-based analysis and said multilingual analysis when said input is a candidate for said multilingual analysis, and identifying the invalid aspects of the invalid URL;
   referring to a local copy of a portion of the Internet DNS URL database, the local copy updated dynamically for affirming the validity of the URLs contained in the local copy;
   determining from said local copy, a valid alternative URL based on analyzing the invalid URL input;
   determining availability of a website corresponding to said valid alternative URL;
   if the website is currently unavailable, displaying a browser DNS error page to indicate that a page cannot be displayed; and
   if the website is currently available, displaying a smart error page comprising said valid alternative URL, a partial search result comprising a name of a topic related to the invalid URL input, and a link that when asserted provides an extensive listing of search results related to the invalid URL input.

29. A computer readable medium having stored thereon a plurality of computer-executable instructions for performing the method of claim 28.

30. A method according to claim 28, further comprising third displaying a link which enables full blown search utilizing the invalid URL input as a query search term.

31. A method according to claim 28, wherein the smart error message further comprises a mini-search result of topics related to the invalid URL input.

32. A method according to claim 28, further comprising analyzing the invalid URL input based upon at least one database of known URLs.

33. A method according to claim 28, wherein the browser DNS error page further comprises a text warning that the web site might be experiencing technical difficulties thereby preventing display of said page.

34. A computing device providing automatic universal resource locator (URL) analysis in connection with a process implicating a URL input mechanism, comprising: means for providing input to the URL input mechanism of the computing device; means for determining whether the URL input is valid and if invalid, detecting whether said input is a likely candidate for multilingual analysis, and if said input is a likely candidate for said multilingual analysis, transmitting said URL input with a means for transmitting to a server computing device for intelligent rules-based analysis of the invalid URL input, including said multilingual analysis, and identification of the invalid aspects of the invalid URL; and means for displaying an error page containing a valid alternative URL that is obtained by said server from a local copy of a portion of the Internet DNS URL database, the local copy updated dynamically for affirming the validity of the known URLs and the local copy comprising a block list for blocking the use of undesirable domains, the error page further comprising a partial search result comprising a name of a topic related to the invalid URL input, and a link that when asserted provides an extensive listing of search results related to the invalid URL input.

35. A computing device according to claim 34, further including means for preprocessing said URL input.

36. A computing device according to claim 35, wherein said means for preprocessing includes means for preprocessing the URL input to at least one of (1) remove non-domain name service (DNS) characters (2) to replace non-DNS characters and (3) to correct an error in protocol.

37. A computing device according to claim 34, wherein said computing device includes a browser and the URL input is intended for one of navigation to and search on a Web site.

38. A computing device according to claim 34, further including means for performing a search with the invalid URL input as a query and means for displaying the results of the search on the error page.

39. A computing device according to claim 34, further including means for displaying a link on the error page, which link, if asserted by a user, retries the original URL input.

40. A computing device according to claim 34, further including means for tracking user behavior in response to the display of the error page.

41. A computing device according to claim 34, wherein said rules based analysis includes means for applying rules from a rules based table.

* * * * *